April 21, 1953  E. A. ARP  2,635,489
MACHINE FOR BORING BEARING SHELLS
Filed Dec. 15, 1951  3 Sheets-Sheet 1

INVENTOR.
EWALD A. ARP
BY
Braddock and Braddock
ATTORNEYS

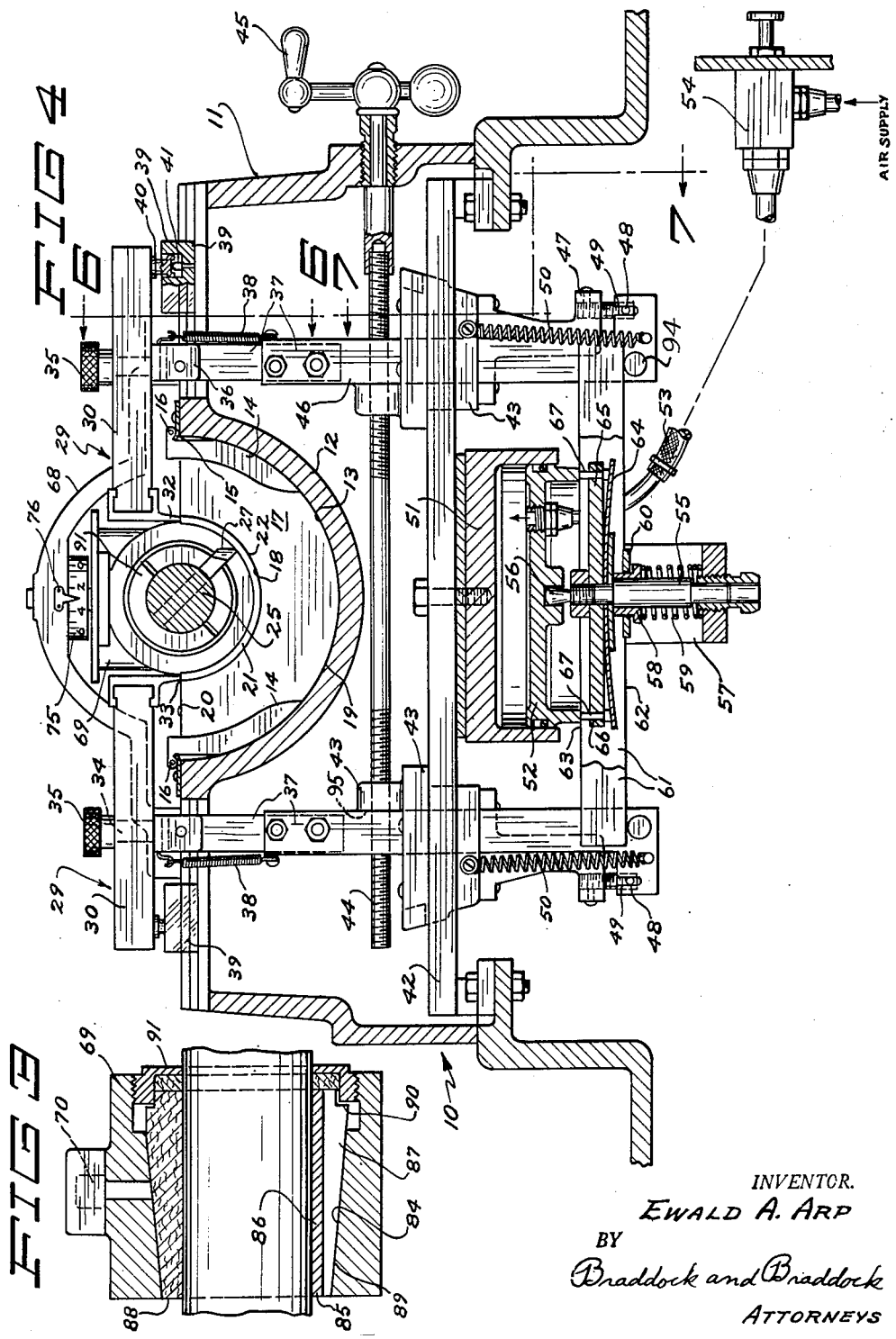

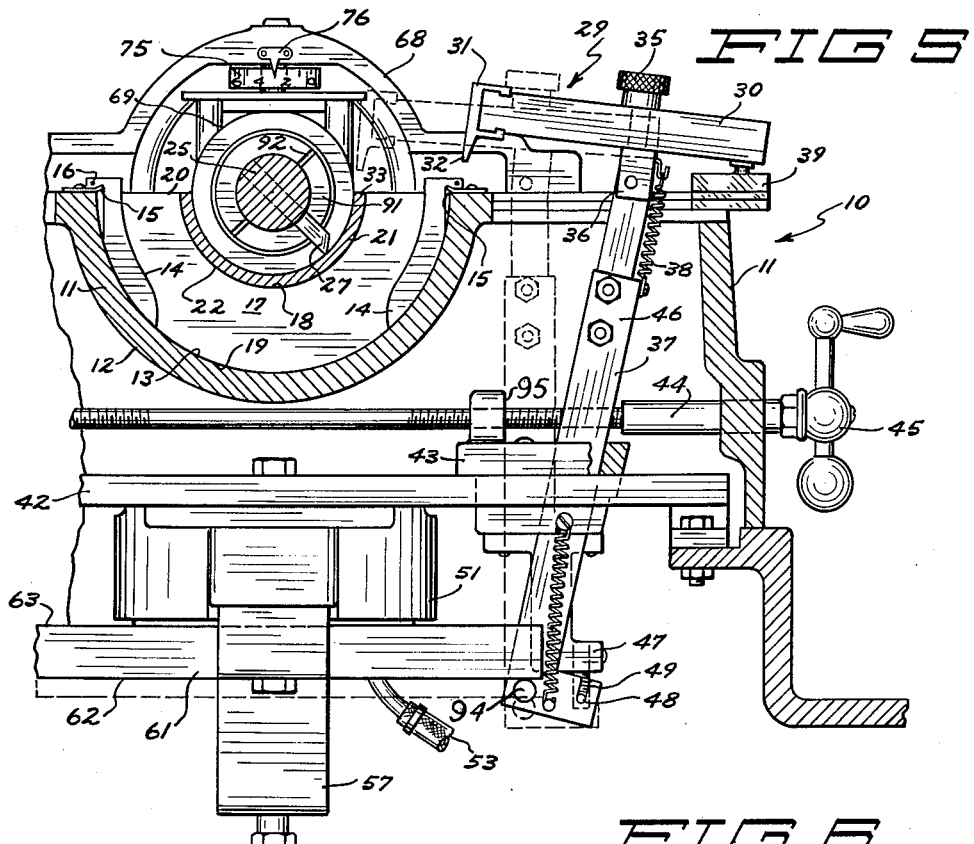
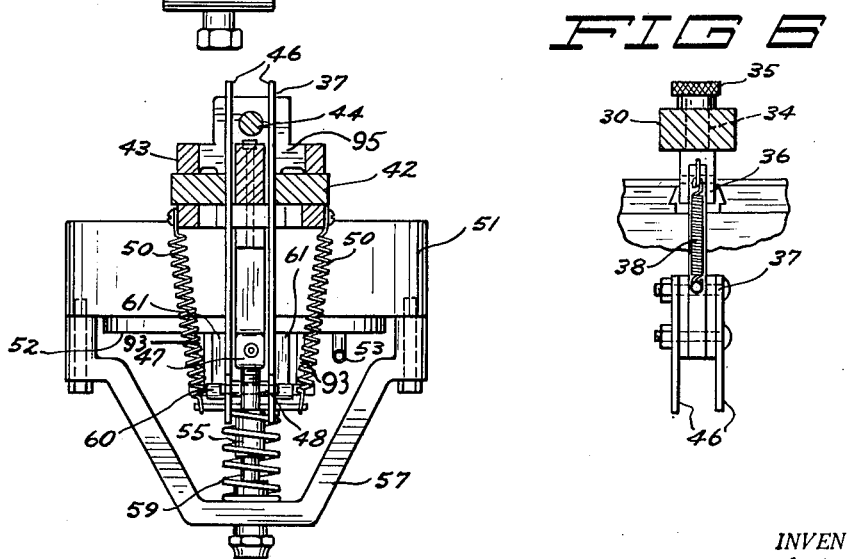

Patented Apr. 21, 1953

2,635,489

UNITED STATES PATENT OFFICE 2,635,489

MACHINE FOR BORING BEARING SHELLS

Ewald A. Arp, Minneapolis, Minn., assignor to Tobin-Arp Manufacturing Company, Minneapolis, Minn., a corporation of Minnesota Application December 15, 1951, Serial No. 261,844

19 Claims. (Cl. 77—3)

This invention relates to a machine which is particularly useful in boring concentric or eccentric bearing shells such as those used as inserts in the crank ends of connecting rods in automotive engines.

This invention is an improvement over my Patent No. 2,260,158, for Machine for Boring Bearing Shells granted October 21, 1941.

An arcuate surface and a pair of arcuate semicircular discs are used to position a bearing shell which is to be bored. Mechanism powered by an air cylinder is utilized to cause clamping arms to move into clamping relation with spaced apart portions of said bearing shell. The position of a boring bar with respect to said arcuate surface is adjustable with extreme accuracy to enable the machine to be used to bore bearing shells to have the axis of bore spaced from the axis of the outside surface of said shells. This positioning mechanism is so constructed that wear in the bearing supporting the boring bar can be taken up without affecting the accuracy of the mechanism.

In the drawings which accompany this specification and form a part thereof,

Fig. 3 is an enlarged vertical sectional view taken on the line 3—3 in Fig. 2;

Fig. 4 is an enlarged vertical sectional view taken on line 4—4 in Fig. 1;

Fig. 5 is a vertical sectional view taken from the same position as Fig. 4 but showing the parts in different positions;

Fig. 6 is a vertical sectional view taken on the line 6—6 in Fig. 4; and

Fig. 7 is a vertical sectional view taken on the line 7—7 in Fig. 4.

Figure 1:
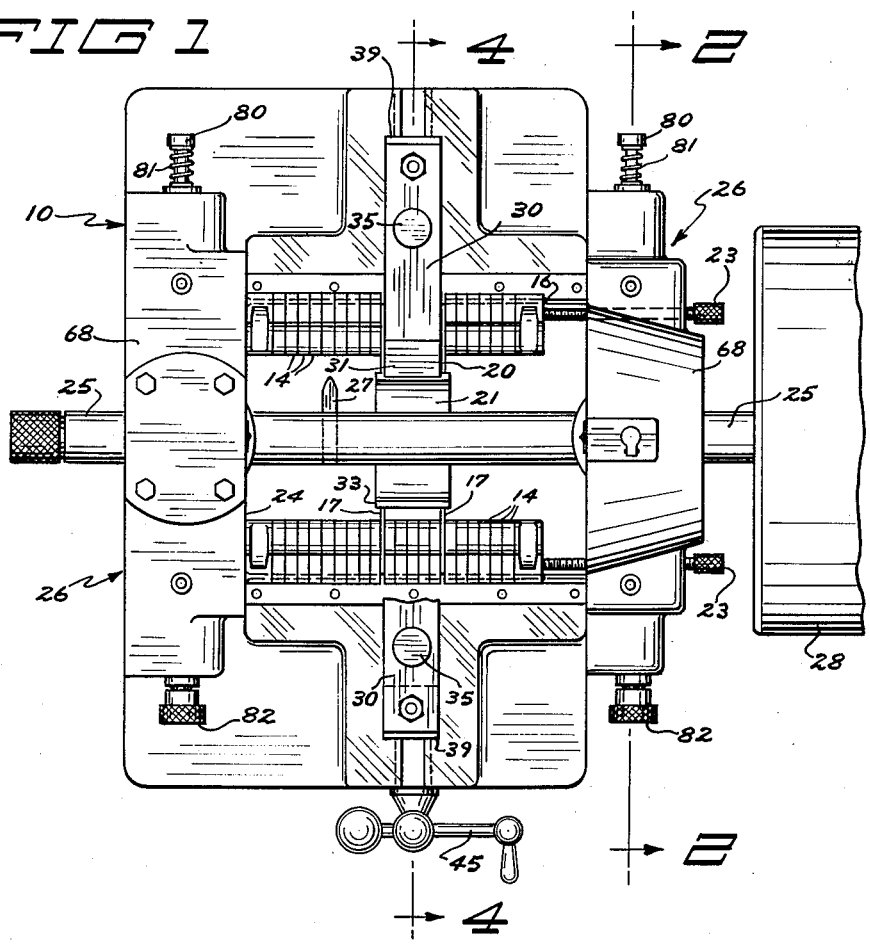
Fig. 1 is a top plan view of a machine of the invention.

A boring machine 10 includes a frame 11. A half-cylindrical supporting member 12 is constituted as an integral part of a central portion of the top surface of said frame and has a cylindrical inner supporting surface 13. Two banks of retaining fingers 14 are supported at opposite edges of said supporting member 12 by extensions 15 at the top surface of the frame. Each bank of retaining fingers is held together by a rod 16 which is longer than the combined widths of the retaining fingers through which it passes. Semicircular discs 17—17 each have an inner part-cylindrical surface 18 and an outer part-cylindrical surface 19 concentric therewith. A flat edge surface 20 passes near the axis of each disc 17 parallel to a diameter thereof. The outer cylindrical surface 19 is of the same diameter as the inner cylindrical supporting surface 13 of the supporting member 12. A bearing shell to be bored is denoted 21 and has an outer part-cylindrical surface 22 of identical diameter with the inner surface 18 of the disc 17. The discs are positioned to be in contact with the inner supporting surface 13 of the supporting member 12 and to be situated between fingers of the banks of retaining fingers 14 so that the bearing shell 21 can be supported on the inner surface 18 of said discs. Knurled and threaded bolts 23 are for forcing the fingers in the bank 14 against an opposite end wall 24 of the supporting member 12 to fixedly position discs 17—17 with respect to the supporting member. A boring bar 25 is mounted in a pair of bearing assemblies 26—26 to be rotatable and slidable and to be adjustable therein in vertical and horizontal direction. A tool bit 27 is adjustably mounted in the boring bar to extend to the exact radius which it is desired to bore the bearing shell 21. The manner of supporting the tool bit in the boring bar forms no part of the present invention.

A drive mechanism 28 is for rotating the boring bar and causing it to be moved longitudinally of its axis. This drive mechanism can be of any standard construction and forms no part of the invention.

The two clamping members 29—29 are for clamping the bearing shell to be bored firmly in place with respect to the supporting member 12 against the inner surface 18 of the semi-circular discs 17—17. These clamping members each include an elongated clamping head 30 and a clamping jaw 31. A lower extension 32 of the clamping jaw is for contacting ends 33 of the bearing shell 21. A head anchoring bolt 34 extends through a central portion of the clamping head 30 and is fixed thereto by means of the knurled nut 35. A lower bifurcated end 36 of the anchoring bolt 34 is pivotally connected to an upper end portion of a link 37. A tension spring 38 is connected to said anchoring bolt and to said link at a side of said pivotal connection therebetween away from the clamping jaw to cause the clamping member to tend to rotate to keep said clamping jaw in a raised position with respect to the bearing shell 21.

A clamping head supporting member 39 is slidably mounted in the top surface of the frame 11 as best seen in Fig. 4. A clamping head post 40 extends outwardly from a portion of said clamping head opposite said clamping jaw, extends into a pocket in supporting member 39 and is supported upon the top of stud 41 mounted therein.

A guide bar 42 extends from one side of the frame to the other in direction perpendicular to the axis of the supporting member 12. A pair of slidable pivot members 43—43 are slidably mounted on said bar 42. A rod 44 extends through one side of the frame to position adjacent the other side. It is parallel to the guide bar 42, is situated directly over it and is threadably connected to each of the slidable pivot members 43—43, one by left hand threads and one by right. A handle 45 is for rotating the rod to move the pivot members outwardly and inwardly with respect to the axis of the supporting member 12.

The lower portion of the link 37 consists of a pair of straps 46—46 which extend through a vertical opening in the pivot member 43. A lower end portion 47 of said slidable pivot member 43 adjustably supports a pivot pin 48. Each of the straps 46—46 which constitute the lower part of the lever 37 is provided with an elongated slot 49 at a lower portion thereof and each has a force receiving pin 94 extending outwardly therefrom. A forward interior surface 95 partially defining said vertical opening in said slidable pivot member 43 is for contacting the straps 46—46 to prevent rotation of link 37 in direction toward the axis of the supporting member past the vertical. A tension spring 50 is connected between the pivot members 43—43 and lower portions of the straps 46—46 in position to tend to cause the lever 37 to be rotated about the pivot pin 48 to carry the clamping jaw 31 away from its clamped position.

An inverted cylinder 51 having a closed upper end and an open lower end is mounted at a lower side of said bar 42. A piston 52 is positioned in said cylinder. An air line 53 is open to the inside of said cylinder through the wall of the piston and a cut-off valve 54 mounted in the frame of the machine is for selectively permitting and preventing the access of air under pressure (from a source not shown) to the air line.

A piston rod 55 is pivotally mounted at 56 to the piston 52 to allow the piston to have limited freedom to pivot with respect to the piston rod in direction perpendicular to the axis of the supporting member 12. A retaining yoke 57 extends downwardly from the inverted cylinder 51 and an outer end of the piston rod 55 is slidably mounted therein. A collar 58 is slidably mounted on said piston rod and a compression spring 59 between said collar and said yoke urges said collar in upward direction. A strap 60 is situated in surrounding and clearing relation to collar 58 and extends outwardly therefrom in direction parallel to the axis of said supporting member. A pair of force transmitting bars 61—61 are situated to have a lower edge 62 in contact with the top of the strap 60 and upper edges 63 in contact with a skirt of the piston 52. Outer ends of these bars extend to position above and alined with force receiving pins 94. Said strap 60 and said piston are bolted together by bolts 93—93 to fixedly position said bars 61—61.

A leaf spring 64 rests on a shoulder of the piston rod 55 and extends outwardly therefrom. A positioning plate 65 immediately adjacent the top side of said leaf spring is fixedly mounted on said piston rod, extends outwardly therefrom to cover said spring and is provided with a pair of vertical holes 66—66 at outer ends thereof. A pair of headed pins 67—67 extend through said holes 66—66 to have the heads thereof between said positioning plate 65 and said leaf spring 64 and to have ends opposite said heads in contact with the lower edge of the skirt of said piston 52. The piston 52 and the cylinder 51 are of dimension to permit a slight rocking of said piston in said cylinder.

Each bearing assembly 26 includes an outer bearing housing 68 which is permanently mounted with respect to the frame and an inner bearing housing 69 which is mounted inside of the outer housing. The inner bearing housing 69 has a pair of openings 70—70 which receive upstanding pins 71—71. Said pins 71—71 are fixedly mounted in a pin supporting member 72. This pin supporting member is urged in upward direction by compression coil spring 73 acting between it and said outer bearing housing 68. A bearing adjusting screw 74 is threadably mounted in the top of said outer bearing housing 68 and acts to limit the movement in upward direction of the inner bearing housing acting under the force of compression of the spring 73. An indicating segment 75 is pinned to said adjusting screw 74 to rotate therewith. An indicator 76 is situated on the outer bearing housing 68.

Figure 2:
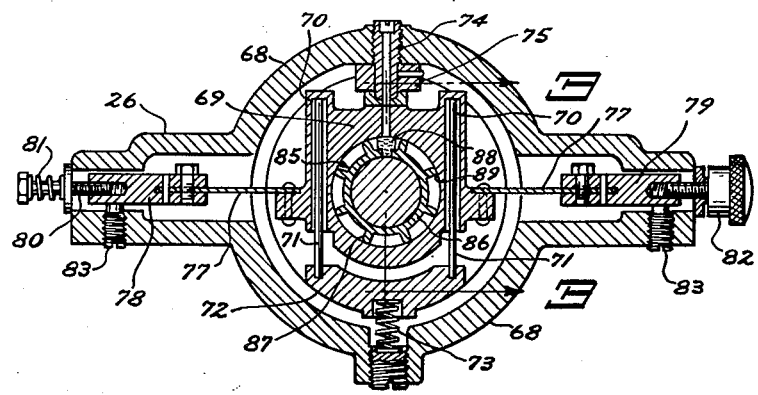
Fig. 2 is an enlarged sectional view taken on the line 2—2 in Fig. 1.

Supporting straps 77—77 are permanently affixed to and extend outwardly from ears integral with the sides of said inner bearing housing. Said supporting straps 77—77 lie in a horizontal plane passing through the axis of a boring bar bearing 85 and outer ends thereof are fixedly connected to positioning blocks 78 and 79. A pin 80 extends outwardly from the positioning block 78 at the left thereof as seen in Fig. 2 and a compression spring 81 acting on a head of said pin is for forcing the positioning block in direction to the left as seen in that figure. A knurled headed and threaded bolt 82 is operably mounted in an outer end of the positioning block 79 to the right as seen in Fig. 2 and can be adjusted to cause the positioning blocks and the inner bearing housing to be moved to the right in Fig. 2 against the action of the coil spring 81. A pair of set screws 83—83 are for clamping the positioning blocks 78 and 79 firmly in fixed relation to the outer bearing housing 68 after the axis of the bearing has been exactly alined vertically with the axis of the supporting member 12.

An inner surface 84 of the inner bearing housing 69 is cone shaped in configuration as best seen in Fig. 3. The boring bar bearing 85 is constituted as a thin cylindrical wall 86 and a number of radially extending ribs 87 integral therewith. A gap in the cylindrical wall at a top portion of the bearing is filled with an oil absorbing wicking 88. The outer edge portions of the outer ribs 87 are tapered to exactly fit the cone shaped surface 84 of the inner bearing housing 69. A shoulder 90 on each of the radial ribs at the large end thereof is for receiving thrust from a threaded collar 91 which is operably mounted in the edge of the inner bearing housing 69 adjacent the largest dimension of the conical inner surface 84. A slot 92 is provided in the face of the collar 91 to facilitate the turning of the collar in the edge of the inner bearing housing to force the bearing 85 into the cone shaped surface 84.

When it is desired to bore a particular bearing shell 21 to a required dimension, a pair of semicircular discs 17—17 having an inner cylindrical surface 18 of diameter equal to the outside diameter of the bearing shell 21 to be bored are selected. The discs selected are placed with their outer cylindrical surfaces 19 in contact with the inner supporting surface 13 of the supporting member 12 and are situated between fingers of banks of retaining fingers 14 so that the space between the discs will be somewhat less than the width of the bearing shell to be bored. The knurled bolts 23 are turned down tightly against the fingers to clamp them against the discs 17—17 and against the end wall 24 of the supporting member 12. The bearing shell 21 which is to be bored is placed on the discs 17 to have its outer surface in contact with the inner cylindrical surface 18 of the discs.

Up to this point, the cut-off valve 54 is in position to prevent access of air from a source of air under pressure to the air line 53 and the parts will be positioned as shown in full lines in Fig. 5. The piston 52, the piston rod 55, the strap 60 and the force transmitting bars 61—61 will be in their uppermost position due to the action of the compression spring 59 on the collar 58. The tension spring 50 will have caused the link 37 to have the upper end thereof rotated away from the center of the frame about the pivot pin 48. This rotation of the link 37 will be limited by the action of the force receiving pins 94 on the bottom surface of the force transmitting bars 61 as best seen in Fig. 5. The tension spring 38 will cause the clamping head 30 to be rotated in clockwise direction as seen in Fig. 5 to insure that post 40 maintains its contact with stud 41 in the clamping head supporting member 39.

To clamp the bearing shell 21 with respect to the frame of the machine, the cut-off valve 54 is moved to position to permit access of air under pressure to the air line 53. This causes the air under pressure to act against the piston 52 in the cylinder 51 and to force the piston in downward direction. The force transmitting bars 61—61 resting against the skirt of the piston 52 are forced in downward direction by the action of the piston and transmit their force to the force receiving pins 94 on the straps 46—46. This causes the links 37 to rotate about the pivot pin 48 in counterclockwise direction as seen in Fig. 5 against the action of the tension spring 50. As the link 37 moves to the left as seen in Fig. 5, the head anchoring bolt 34 and consequently the clamping member 29 each moves to the left with it. The clamping head supporting member 39, acting under the force of the post 40 at the rear of the clamping head 30, moves to the left in Fig. 5 in the top surface of the frame 11. The rotation of the link 37 about the pivot pin 48 continues until the straps 46—46 come in contact with the inner vertical surface 95 of the vertical opening in the pivot member 43. The relative positioning of parts when this takes place is indicated by the broken lines in Fig. 5.

With further movement in downward direction by the piston 52, the force transmitting bars 61—61 and the force receiving pins 94 cause the link 37 to be moved in vertical direction. Since the rear end of the clamping head 30 is fixed against movement in downward direction by the post 40 resting on the stud 41 in the clamping head supporting member 39, further vertical downward movement of the link 37 will cause the clamping member 29 to pivot about said stud 41 and thereby bring the lower extension 32 of the clamping jaw 31 in contact with an end 33 of the bearing shell 21.

In order to accommodate bearing shells of varying dimension, it is necessary that the clamping jaw be adjustable to come to rest closer to and farther from the axis of the supporting member 12. This is done by rotating the rod 44 through the use of the handle 45 to move the slidable pivot members 43—43 closer to and farther away from the center of the frame. Since the force transmitting bars make contact with the force receiving pins along a horizontal plane surface at the bottom side of said bars, it is obvious that the clamping action will not be affected by the position at which the force receiving pins 94 make contact with the force transmitting bars.

In the event that the bearing shell 21 is not placed in contact with the discs 17—17 to have both of the ends 33 thereof lying in a single horizontal plane, the action of the clamping jaws thereon will be such that the bearing shell will normally slide to position where the two ends 33 are in such horizontal alinement. If, because of foreign matter between the bearing shell and the discs or for any other reason, the bearing shell does not slide under the force of the clamping jaw to position where the ends 33 are in a single horizontal plane, the clamping mechanism will adjust itself to cause equal pressure to be exerted by each of the clamping jaws. When one of these jaws 31 encounters an end 33 of the bearing shell 21 in advance of the opposite jaw, a greater resistance to downward movement will be exerted by the force receiving pin 94 on that side of the machine. This will cause the force transmitting bars to tip toward the opposite side of the machine and will force the piston 52 to rock slightly with respect to the cylinder 51. The opposite end of the force transmitting bars will then force the opposite link 37 in downward direction until said opposite jaw is brought in contact with the opposite end 33 of the shell 21. An equilibrium will then be established such that the force exerted by each of the clamping jaws is equal to that exerted by the other. In the process of tipping or rocking, the piston 52 forces one of the headed pins 67 in downward direction against the action of the leaf spring 64. It will be evident that, when the air pressure is cut off, the leaf spring 64 will cause the depressed headed pin 67 to return to its normal position and so will cause the piston to become alined in perpendicular relation to the cylinder 51. This construction is used to prevent the jamming of the piston in the cylinder.

Since the inner and outer surfaces of each pair of discs are concentric and have a common axis, the outer cylindrical surface of each bearing shell 21 will be concentric with the inner cylindrical supporting surface 13 of the supporting member 12 and will have a common axis with said supporting member and with the inner surfaces of the discs 17—17. Where it is desired that the bore of the bearing shell be concentric with the outer surface thereof, it is necessary that the axis of the boring bar coincide with that of the inner supporting surface 13 of the supporting member 12. Many bearing shells are designed to have the axis of the bore of the bearing shell slightly spaced from the axis of the outer cylindrical surface of the bearing shell. To provide for this eccentricity, it is necessary that the axis of the boring bar be above the common axis of the outer cylindrical surface of the bearing shell and the inner supporting surface of the supporting member 12.

For reference in adjusting of the boring bar bearings 85 with respect to the axis of the supporting member 12, the indicating segment 75 is provided with a series of calibrations as best seen in Figs. 4 and 5. These calibrations are such that when the bearing adjusting screw 74 is turned to position the zero reading on the calibrations in alinement with the indicator 76, the axis of the boring bar will coincide with the axis of the supporting member. When it is desired to raise the axis of the boring bar, each of the bearing adjusting screws 74 can be rotated until the calibration corresponding to the desired eccentricity is alined with the indicators 76. A tool bit 27 is positioned in the boring bar to extend therefrom sufficiently to have the dimension from the tip of the tool bit to the axis of the boring bar equal to the radius of the bore desired in the boring shell. The drive mechanism 28 is put into operation to cause the tool bit to be rotated and moved longitudinally of the axis of the boring bar.

As previously described, the positioning blocks 78 and 79 are locked in position by means of the set screws 83—83 to permanently position the axis of the boring bar bearing 85 in vertical alinement with the axis of the inner surface 13 of the supporting member 12. In normal operation of the machine, it will not be necessary to readjust these positioning blocks. Should abnormal handling of the machine cause a vertical misalinement of the axes of the boring bar bearings 85 and the supporting member, the positioning blocks may be repositioned as previously described.

After the machine has seen considerable use, the boring bar bearing 85 at each end of the frame of the machine may become worn. It will be necessary to take up this wear. In order that the calibrations of the indicating segment 75 continue to give a true indication of the spacing of the axis of this boring bar bearing from the axis of the supporting member and in order that the two axes remain in exact vertical alinement, it is necessary that the bearing be adjusted without changing the relative position of the axis thereof with respect to the inner bearing housing 69. This is done by causing every portion of the inner surface of the bearing 85 to be moved inwardly for the same distance as every other portion of the bearing surface. To do this, the collar 91 is rotated by means of the slot 92 therein to force the ribs 87 of the bearing 65 farther into the cone shaped inner surface 84 of the inner bearing housing 69. This will cause the thin cylindrical wall 86 to be moved inwardly at a uniform rate throughout its inner circumference. By this means the wall 86 can be adjusted back to its original unworn inner dimension. The axis of the inner surface thereof will not change position during this adjustment.

What is claimed is:

1. A machine for boring bearing members comprising a frame, a boring bar, a tool bit in said boring bar, a boring bar bearing, means for clamping a bearing member in fixed relation to said frame, and manually adjustable means for selectively positioning said boring bar bearing through infinite gradients from eccentric to concentric relationship with said bearing member.

2. A machine for boring bearing members comprising a frame, a boring bar, a tool bit in said boring bar, means for clamping a bearing member in fixed relation to said frame, adjustable means for selectively positioning said boring bar to be concentric and eccentric with relation to said bearing member, and indicating means adapted to indicate the eccentricity of said boring bar in relation to said bearing member.

3. A machine for boring bearing members comprising a frame, a boring bar, a tool bit in said boring bar, a boring bar bearing, means for clamping a bearing member in fixed relation to said frame, and adjustable means for selectively positioning said boring bar bearing to be concentric and eccentric with relation to said bearing member, said boring bar bearing being adjustable to take up wear without changing the eccentricity of the boring bar with respect to said bearing member.

4. In a force transmitting device, a cylinder, a piston mounted in said cylinder for limited rocking action therein, means for delivering fluid under pressure into said cylinder, a piston rod pivotally mounted with respect to said piston and slidable longitudinally with respect to said cylinder, a force transmitting bar extending outwardly from and rigid with said piston, a pair of force receiving pins positioned to resist movement of said force transmitting bar, means mounted on said piston rod to exert a force on said piston tending to cause a pressure receiving face of said piston to move into perpendicular relationship to the direction of travel of said piston rod.

5. A machine for boring bearing members comprising a frame, a boring bar, a tool bit in said boring bar, a boring bar bearing, means for clamping a bearing member in fixed relation to said frame, adjustable means for selectively positioning said boring bar bearing to be concentric and eccentric with relation to said bearing member, and indicating means adapted to indicate the eccentricity of said boring bar bearing in relation to said bearing member, said boring bar bearing being adjustable to take up wear without changing the eccentricity of the boring bar bearing with respect to said bearing member.

6. In a machine for boring a bearing member, the combination with a frame, a boring bar, a tool bit in said boring bar and means for supporting a bearing member in concentric relation to said boring bar of a pair of clamping members each including a clamping jaw, a pair of links each pivotally connected to one of said clamping members, a pair of slidable pivot members each mounted in said frame, having a vertical opening therethrough and providing a vertical inner surface bounding said vertical opening, a pivot pin fixedly positioned with respect to a lower portion of each of said pivot members, a slot in a lower portion of each link, each link being adapted to extend through said vertical opening in one of said pivot members and each pivot pin being adapted to ride in one of said slots, a force receiving pin extending outwardly from a lower portion of each of said links, a tension spring connected to each of said links to urge said link to pivot around said pivot pin in direction away from said bearing member, an inverted cylinder mounted with respect to said frame, a piston in said cylinder, means for selectively permitting and preventing access of air under pressure to enter said cylinder between said piston and a closed end of said cylinder, a force transmitting bar fixedly mounted with respect to said piston and extending outwardly therefrom to position vertically alined with and above each of said force receiving pins.

7. Mechanism for causing clamping action including a frame, a clamping member having a clamping jaw, a link pivotally mounted with respect to said clamping member, extending downwardly therefrom and being provided with a slot 2,635,489

9 parallel to its longitudinal dimension at a side thereof opposite said clamping jaw, a pivot pin fixedly mounted with respect to said frame and adapted to fit into said slot, a force receiving pin extending outwardly from said link at a side of said slot adjacent said jaw, a horizontal force transmitting bar in vertical alinement with and situated above said force receiving pin, and a vertical stop member fixedly positioned with respect to said frame having a vertical stopping surface in alinement with said link and being adapted to limit rotation of said link around said pivot pin when said force transmitting bar and force receiving pin are moved in downward direction by said means.

8. Mechanism for causing clamping action including a frame, a clamping member having a clamping jaw, a link pivotally mounted with respect to said clamping member, extending downwardly therefrom and being provided with a slot parallel to its longitudinal dimension at a side thereof opposite said clamping jaw, a pivot pin fixedly mounted with respect to said frame and adapted to fit into said slot, a tension spring fixedly mounted with respect to said frame and attached to said link to urge said link to rotate in direction to raise said clamping jaw with respect to said frame, a force receiving pin extending outwardly from said link at a side of said slot adjacent said jaw, a horizontal force transmitting bar in vertical alinement with and situated above said force receiving pin, and a vertical stop member fixedly positioned with respect to said frame having a vertical stopping surface in alinement with said link and being adapted to limit rotation of said link around said pivot pin when said force transmitting bar and force receiving pin are moved in downward direction by said means.

9. In a machine for boring bearing members having a frame, a boring bar, a tool bit in said boring bar, and means for supporting a bearing member in concentric relation to said boring bar; mechanism for clamping an end of said bearing member including a clamping member having a clamping jaw, a link pivotally mounted with respect to said clamping member, a first tension spring fastened to said link and said clamping member to urge said clamping member to carry said clamping jaw in upward direction, a horizontal bar fixedly mounted in said frame to be perpendicular to the axis of said boring bar, a pivot member slidably mounted on said horizontal bar, having a vertical opening therethrough and being provided with a vertical inner surface bounding said vertical opening at a side thereof adjacent the bearing member, a pivot pin fixedly positioned with respect to a lower portion of said pivot member, said link having an offset lower end portion provided with a slot therein for receiving said pivot pin and said link being adapted to extend through said vertical opening in said pivot member, a second tension spring fastened to a lower portion of said link and said pivot member to urge said link to rotate about said pivot pin in direction to cause said clamping jaw to move away from the bearing member, a force receiving pin extending outwardly from a lower portion of said link between said slot and said bearing member, an inverted cylinder closed at a top end thereof fixedly mounted on said horizontal bar, a piston operably mounted in said cylinder, spring means for urging said piston in upward direction in said cylinder, an air line open to said cylinder between

10 said piston and the closed end thereof, a cutoff valve for controlling the access of air under pressure to said air line, and a force transmitting bar extending horizontally outwardly from a position below and in contact with said piston to position vertically alined with and above said force receiving pins, said piston and said force transmitting bar being adapted to move in downward direction under the action of air under pressure and to move upward when said air under pressure is cut off by said valve, said link being adapted to rotate in direction to cause said clamping jaw to move toward said bearing member under action of said force transmitting bar on said force receiving pin until said link comes in contact with said vertical surface of said pivot member and said link being adapted to move vertically downward under the action of further downward movement of said force transmitting bar and force receiving pin to cause said clamping jaw to be pressingly engaged with a portion of said bearing member.

10. An adjustable bearing holder for use with a boring machine including an outer bearing housing, an inner bearing housing, a bearing in said inner bearing housing for supporting a boring bar, a pair of supporting straps fastening side portions of said inner bearing housing to side portions of said outer bearing housings, a spring urging said inner bearing housing in upward direction with respect to said outer bearing housing and means for adjustably positioning and holding said inner bearing housing with respect to said outer bearing housing against the action of said spring.

11. In a machine of the character described, a device for supporting a boring bar to be adjustable in horizontal direction including an outer bearing housing, an inner bearing housing, a bearing in said inner bearing housing for supporting said boring bar, a bearing adjusting screw threadably mounted in said outer bearing housing and contacting a portion of said inner bearing housing, a spring opposite said adjusting screw between said outer and inner bearing housings for urging said inner bearing housing in direction to make contact with said bearing adjusting screw, first and second supporting straps fixedly mounted with respect to said inner bearing housing and lying in a plane through the axis of said bearing and at right angles to the axis of said bearing adjusting screw, means including a spring for causing said first supporting strap to be urged in direction at right angles to the axis of said bearing, and means including a bolt threadably mounted with respect to said second supporting strap for adjustably fixedly positioning said second strap in said outer bearing housing to resist the action of said means operative on said first supporting strap.

12. In a machine of the character described, the combination with a boring bar and an outer bearing housing of means for adjustably supporting said boring bar in said outer bearing housing including an inner bearing housing, a bearing in said inner bearing housing for supporting said boring bar, a bearing adjusting screw threadably mounted in said outer bearing housing and contacting a portion of said inner bearing housing, a spring between said outer and inner bearing housings for urging said inner bearing housing in direction to maintain contact with said bearing adjusting screw, first and second supporting straps fixedly mounted with respect to said inner bearing housing and lying in a plane through the axis of said bearing and at right angles to axis of said bearing adjusting screw, means including a spring for causing said first supporting strap to be urged in direction at right angles to the axis of said bearing, and means including a bolt threadably mounted with respect to said second supporting strap for adjustably fixedly positioning said second strap in said outer bearing housing to resist the action of said means operative on said first supporting strap.

13. The combination with a rotatable bar and an outer bearing housing of means for adjustably supporting said rotatable bar in said outer housing including an inner bearing housing providing a spaced apart pair of vertical openings extending from the bottom thereof to a closed wall adjacent the top thereof, a bearing in said inner bearing housing for supporting said rotatable bar, a pin supporting member located between said inner and said outer bearing housings, a pair of spaced apart pins fixedly mounted in said pin supporting member and extending into and through said openings in said inner bearing housing to bear against said upper closed wall thereof, a bearing adjusting member adjustably mounted in said outer bearing housing and making contact with an upper portion of said inner bearing housing, and a spring between said pin supporting member and said outer bearing housing for urging said pin supporting member, said pins and said inner bearing housing in direction to maintain contact of said inner bearing housing with said bearing adjusting member.

14. In a machine of the character described, the combination with a boring bar and an outer bearing housing of means for adjustably supporting said boring bar in said outer bearing housing including an inner bearing housing providing a spaced apart pair of vertical openings extending from a bottom thereof to a closed wall adjacent the top thereof, a bearing in said inner bearing housing for supporting said boring bar, a pin supporting member located between said inner and outer bearing housings, a pair of spaced apart pins fixedly mounted in said pin supporting member and extending into and through said openings in said inner bearing housing to bear against said upper closed wall thereof, a bearing adjusting screw threadably mounted in said outer bearing housing and making contact with an upper portion of said inner bearing housing, a spring between said pin supporting member and said outer bearing housing for urging said pin supporting member, said pins and said inner bearing housing in direction to maintain contact of said inner bearing housing with the bearing adjusting screw, first and second supporting straps fixedly mounted with respect to said inner bearing housing and lying in a horizontal plane through the axis of the bearing, means including a spring for causing said first supporting strap to be urged in horizontal direction at right angles to the axis of the bearing, and means including a bolt threadably mounted with respect to said second supporting strap for adjustably fixedly positioning said second strap in said outer bearing housing to resist the action of said means operative on said first supporting strap.

15. In a machine of the character described, the combination with a boring bar and an outer bearing housing of means for adjustably supporting said boring bar in said outer bearing housing including an inner bearing housing providing a spaced apart pair of vertical openings extending from a bottom thereof to a closed wall adjacent the top thereof, a bearing in said inner bearing housing for supporting said boring bar, a pin supporting member located between said inner and outer bearing housings, a pair of spaced apart pins fixedly mounted in said pin supporting member and extending into and through said openings in said inner bearing housing to bear against said upper closed wall thereof, a bearing adjusting screw threadably mounted in said outer bearing housing and making contact with an upper portion of said inner bearing housing in substantially the same horizontal plane as where the pins make contact with the closed wall thereof, a spring between said pin supporting member and said outer bearing housing for urging said pin supporting member, said pins and said inner bearing housing in direction to maintain contact of said inner bearing housing with the bearing adjusting screw, first and second supporting straps fixedly mounted with respect to said inner bearing housing and lying in a horizontal plane through the axis of the bearing, means including a spring for causing said first supporting strap to be urged in horizontal direction at right angles to the axis of the bearing, and means including a bolt threadably mounted with respect to said second supporting strap for adjustably fixedly positioning said second strap in said outer bearing housing to resist the action of said means operative on said first supporting strap.

16. In a machine for boring a bearing member, a frame, means for clamping said bearing member with respect to said frame, a boring bar, a tool bit in said boring bar, and a device for supporting said boring bar with respect to said frame constituted as a bearing housing providing a cone shaped inner surface, a bearing constituted as a part-cylindrical wall extending over slightly less than 360 degrees, a plurality of radial ribs integral with and extending outwardly from said bearing, outer edges of said ribs being so positioned and so shaped as to lie in contact with said cone shaped inner surface of said bearing housing, a collar threadably mounted in said bearing housing adjacent an end thereof having maximum inner dimension adapted to be rotated in said bearing housing to contact said bearing and said radial ribs and force them farther into said housing.

17. Mechanism for supporting a rotatable bar including a bearing housing providing a cone-shaped inner surface, a bearing consisting of a part-cylindrical inner wall, a plurality of radial ribs integral with and extending outwardly from said bearing, outer edges of said ribs so positioned and so shaped as to lie in contact with said cone-shaped inner surface of said bearing housing, and means to force said bearing toward an end of said housing having minimum inner dimension.

18. In a machine for boring bearings, mechanism for supporting a boring bar including a bearing housing providing a cone shaped inner surface, a bearing consisting of a part-cylindrical inner wall, a plurality of radial ribs integral with and extending outwardly from said bearing, outer edges of said ribs so positioned and so shaped as to lie in contact with said cone shaped inner surface of said bearing housing, and a collar threadably mounted in said bearing housing adjacent an end thereof having maximum inner dimension adapted to be rotated in said bearing housing to force said bearing into said housing.

19. In a device of the character described, a cylinder, a piston mounted in said cylinder for limited rocking acttion therein, means for delivering fluid under pressure into said cylinder, a piston rod pivotally mounted with respect to said piston and slidable longitudinally with respect to said cylinder, a force transmitting bar extending outwardly from and rigid with said piston, a pair of force receiving pins positioned to resist movement of said force transmitting bar, a positioning plate on said piston rod parallel to said force receiving bar, a pair of positioning pins extending through and slidable in opposite ends of said positioning plate and contacting opposite skirts of said piston, and a leaf spring on said piston rod urging said positioning pins toward said piston.

EWALD A. ARP.

References Cited in the file of this patent

UNITED STATES PATENTS

| Number | Name | Date |
|---|---|---|
| 2,260,158 | Arp | Oct. 21, 1941 |
| 2,496,379 | Cox | Feb. 7, 1950 |
| 2,612,064 | Arp | Sept. 30, 1952 |
| 2,618,178 | Arp | Nov. 18, 1952 |
| 2,625,843 | Arp | Jan. 20, 1953 |